United States Patent [19]

Heinen

[11] Patent Number: 4,927,113
[45] Date of Patent: May 22, 1990

[54] VALVE CONTROL MECHANISM

[76] Inventor: Irving J. Heinen, 78-086 Lago Dr., La Quinta, Calif. 92253

[21] Appl. No.: 407,440

[22] Filed: Sep. 14, 1989

Related U.S. Application Data

[63] Continuation of Ser. No. 216,727, Jul. 8, 1988, abandoned.

[51] Int. Cl.⁵ .................................................. F16K 25/00
[52] U.S. Cl. ....................................... 251/165; 192/38
[58] Field of Search ........................ 251/164, 165, 166; 192/38, 79

[56] References Cited

U.S. PATENT DOCUMENTS

| | | | |
|---|---|---|---|
| 1,864,596 | 6/1932 | Jones | 251/165 |
| 2,076,838 | 4/1937 | Heggem | 251/164 |
| 2,795,960 | 6/1957 | Heinen et al. | 251/165 X |
| 2,889,133 | 6/1959 | Blomstran et al. | 251/164 |
| 3,414,097 | 12/1968 | Denkowski | 192/38 X |
| 3,505,888 | 4/1970 | Denkowski | 192/38 X |

Primary Examiner—John Fox
Attorney, Agent, or Firm—Plante, Strauss, Vanderburgh & Connors

[57] ABSTRACT

Disclosed is a valve operator which includes a spindle screwed into a sleeve that is seated in a cavity within the housing of the valve operator. The sleeve has a pair of openings therein and the housing has a pair of grooves in its walls. A pair of roller elements, each one seated in a groove and extending through an opening in the sleeve, provide a clutch mechanism. The spindle has recesses which receive the roller elements when the roller elements are aligned therewith. Initial rotation of the spindle within the sleeve causes the sleeve to move linearly until the roller elements are adjacent the recesses, whereupon further rotation of the spindle results in rotation of the sleeve, with the roller elements moving from the groove into the recesses to allow rotation of the sleeve.

5 Claims, 4 Drawing Sheets

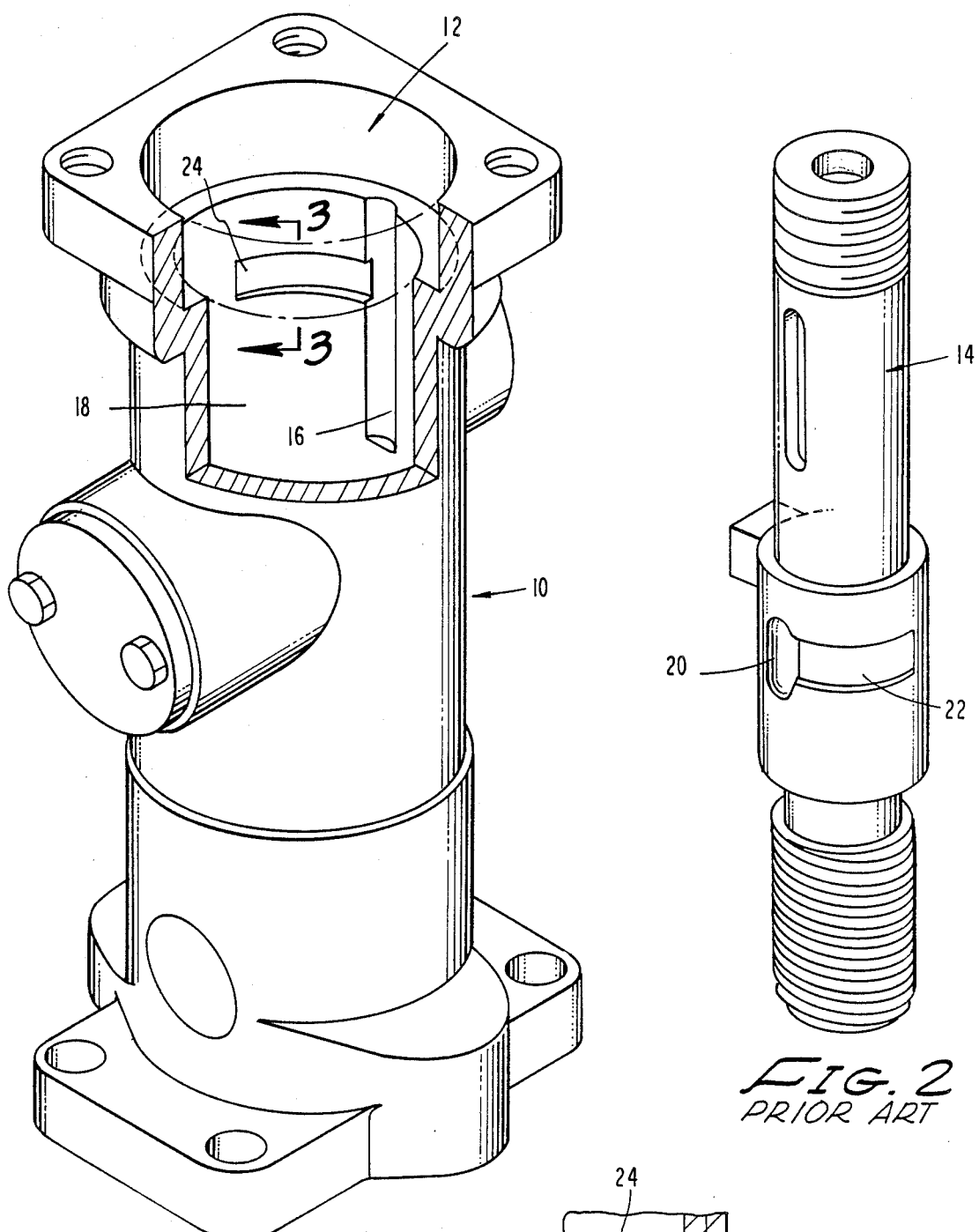
FIG. 1
PRIOR ART
FIG. 2
PRIOR ART
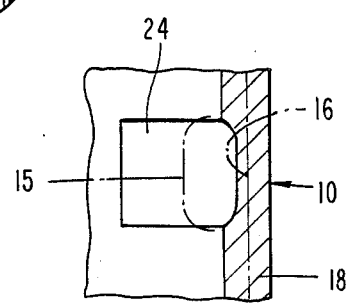
FIG. 3
PRIOR ART

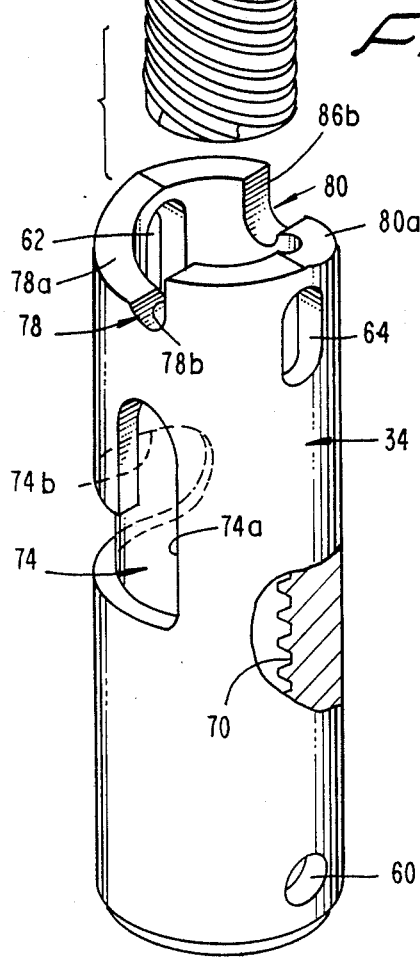
FIG. 4
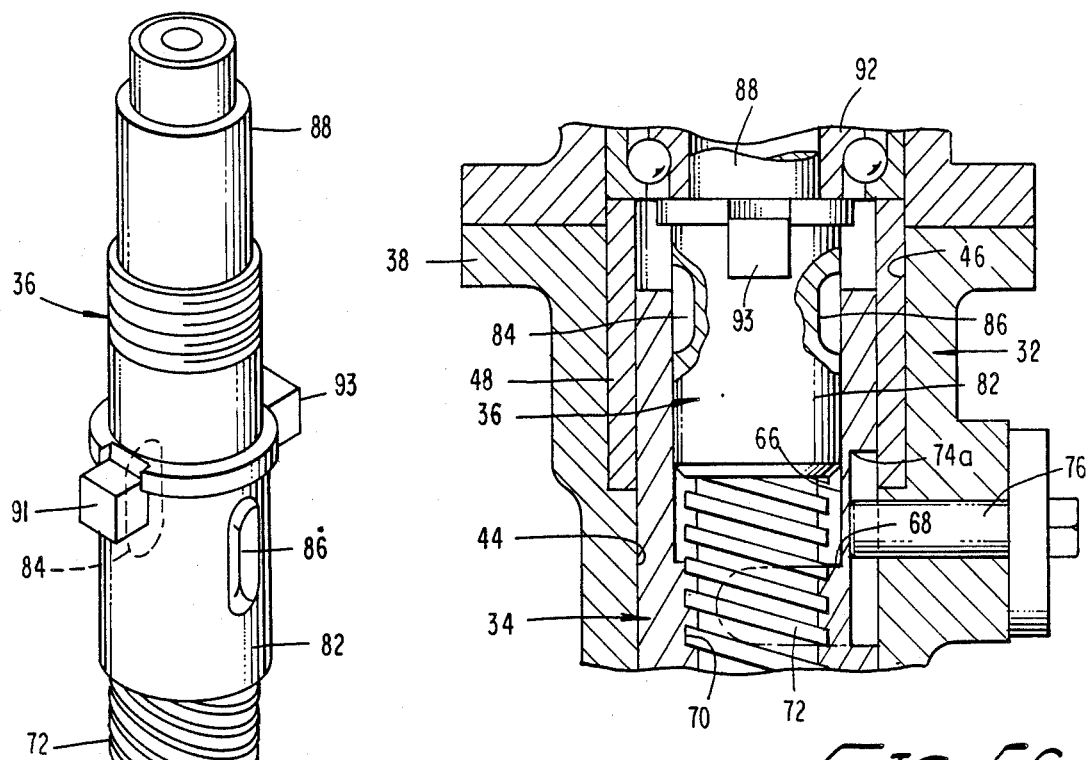
FIG. 5C
FIG. 6D
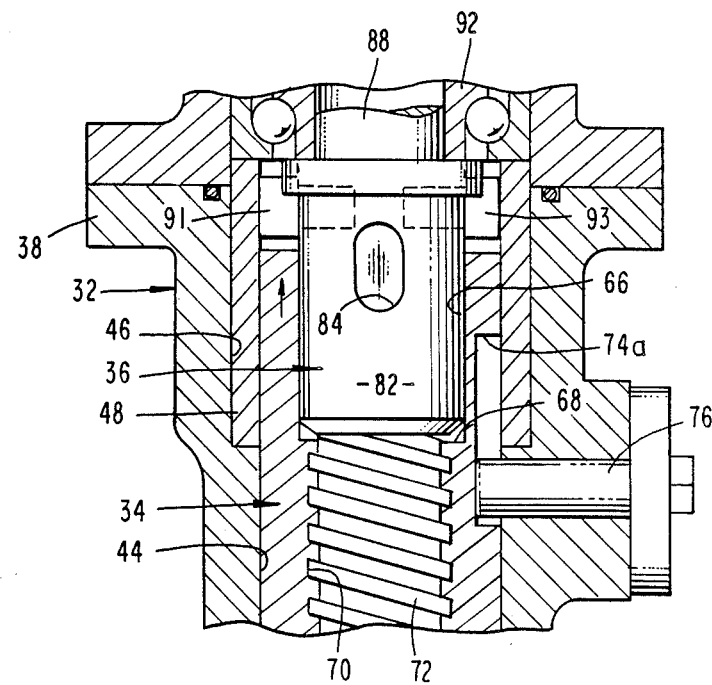

VALVE CONTROL MECHANISM

This is a continuation, of application Ser. No. 07/216,727 filed 7/8/88, now abandoned.

BACKGROUND OF THE INVENTION

1. Field of the Invention

This invention relates to a valve operator for a plug-type valve, and particularly, to a valve operator employing balanced rollers within a clutch-type mechanism for opening and closing the valve.

2. Background Discussion

U.S. Pat. No. 2,795,960 discloses a valve operator used with a plug-type valve. This valve operator is designed to lift a plug from a seat within the body of the plug-type valve and then rotate the plug 90 degrees. This moves the plug from a closed position to a position which opens the valve.

A clutch-type mechanism is employed to allow a sleeve attached to the plug to move linearly, lifting the plug from the seat, by rotating a spindle. A single roller element is carried in the sleeve which is threadably connected to the spindle. The roller element moves in a groove in the housing of the valve operator until it is adjacent a recess in the spindle. When the roller element is adjacent the recess, further rotation of the spindle results in rotation of the sleeve rather than linear movement. This in turn rotates the plug within the valve body.

The problem in employing this clutch-type mechanism is that, when heavy loads are encountered, the roller element slips, scoring the groove and the wall adjacent the recess in the spindle. This scoring over several years eventually results in the valve operator becoming inoperable.

SUMMARY OF THE INVENTION

The present invention overcomes the above problem by employing a valve operator clutch type mechanism using balanced roller elements which are diametrically opposite each other. Consequently, there is a balancing of the forces being exerted on these roller elements and scoring of the housing wall of the operator and the recess in the spindle is eliminated. Prolonged field tests were conducted to verify that the use of balanced roller elements eliminated the problem discussed above.

There are several features of this invention which contribute to its eliminating the problem discussed above, no single one of which is solely responsible for acheiving this result. Without limiting the scope of this invention as expressed by the claims, its more prominent features will now be discussed briefly. After considering this discussion, and particularly after reading the section of this application entitled DETAILED DESCRIPTION OF THE PREFERRED EMBODIMENT, one will understand how the features of this invention eliminate the problem discussed above.

The first feature of this invention is the use of a pair of roller elements which are counter balanced, moving in a pair of elongated longitudinal grooves in the wall of the housing of the valve operator. The grooves are diametrically opposed to each other, and the roller elements are seated in these grooves. Each roller element moves laterally in the groove in which it is seated.

The second feature of this invention is the use of a spindle which has therein a pair of recesses which are diametrically opposite each other. The spindle extends outwardly fron an end portion of the valve operator and has, for example, a wheel attached to it that allows the spindle to be rotated either clockwise or counter clockwise. The rollers will move in the grooves between a first position where they are longitudinally displaced from the recesses in the spindle to a second position where they are aligned with the recesses.

The third feature of the invention is the use of a sleeve which has therein a pair of openings diametrically opposite each other. Preferably, the sleeve is a rotatable, cylindrical element received within the housing of the valve operator, fitting snugly against the housing wall. This rotatable element includes the pair of openings, each one of these openings receiving one of the roller elements. The spindle is threadably connected to the rotatable element so that upon rotation of the spindle it screws into the rotatable element provided the roller elements are in the first position, i.e., displaced from the recesses in the spindle. This will lift the rotatable element, and attached plug, rather than rotating it so it moves laterally within the valve operator housing. This causes the roller elements to be carried to a position opposite the recesses. Further rotation of the rotatable element results in the roller elements dropping into the recesses, passing through openings in the rotatable element. Further rotation of the spindle causes the rotatable element to rotate. This in turn rotates the plug of the valve to move it to the open position. Rotation of the spindle in the opposite direction will result in the plug moving to a closed position and then being moved laterally to seat itself within the body of the valve.

DESCRIPTION OF THE DRAWING

The drawing, which is for illustrative purposes only, depicts the prior art and the preferred embodiment of this invention, in which:

FIG. 1 illustrates the housing of a valve operator of the type disclosed in U.S. Pat. No. 2,795,960 in perspective, with sections broken away, showing scoring of the housing wall.

FIG. 2 is a perspective view of the spindle employed in the housing illustrated in FIG. 1, showing the scoring of the wall adjacent the recess in the spindle.

FIG. 3 is a cross-sectional view taken along line 3—3 of FIG. 1.

FIG. 4 is an exploded perspective view of the sleeve and spindle of the present invention.

FIG. 5C is a cross-sectional view taken along line 5C—5C of FIG. 5A.

FIG. 6D is a cross-sectional view taken along line 6D—6D of FIG. 6A.

DESCRIPTION OF THE PREFERRED EMBODIMENT

Figure 5A:
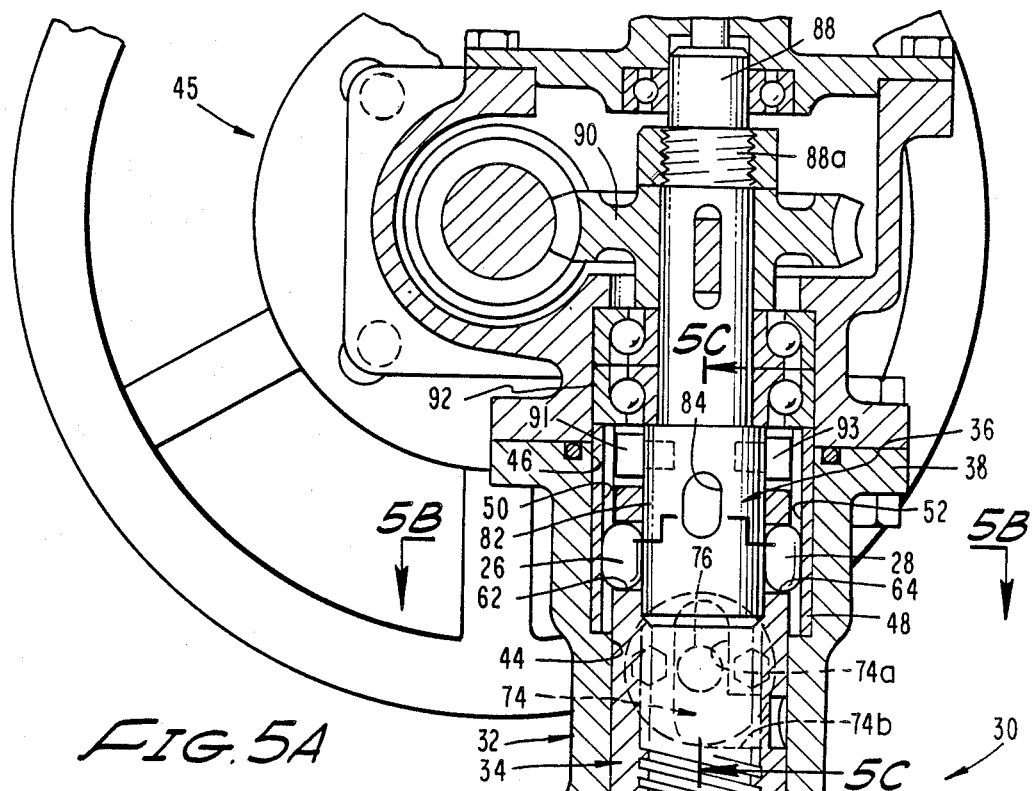
FIG. 5A is a longitudinal cross-sectional view showing the valve operator of this invention in position where the plug is seated in the body of the valve.
Figure 5B:
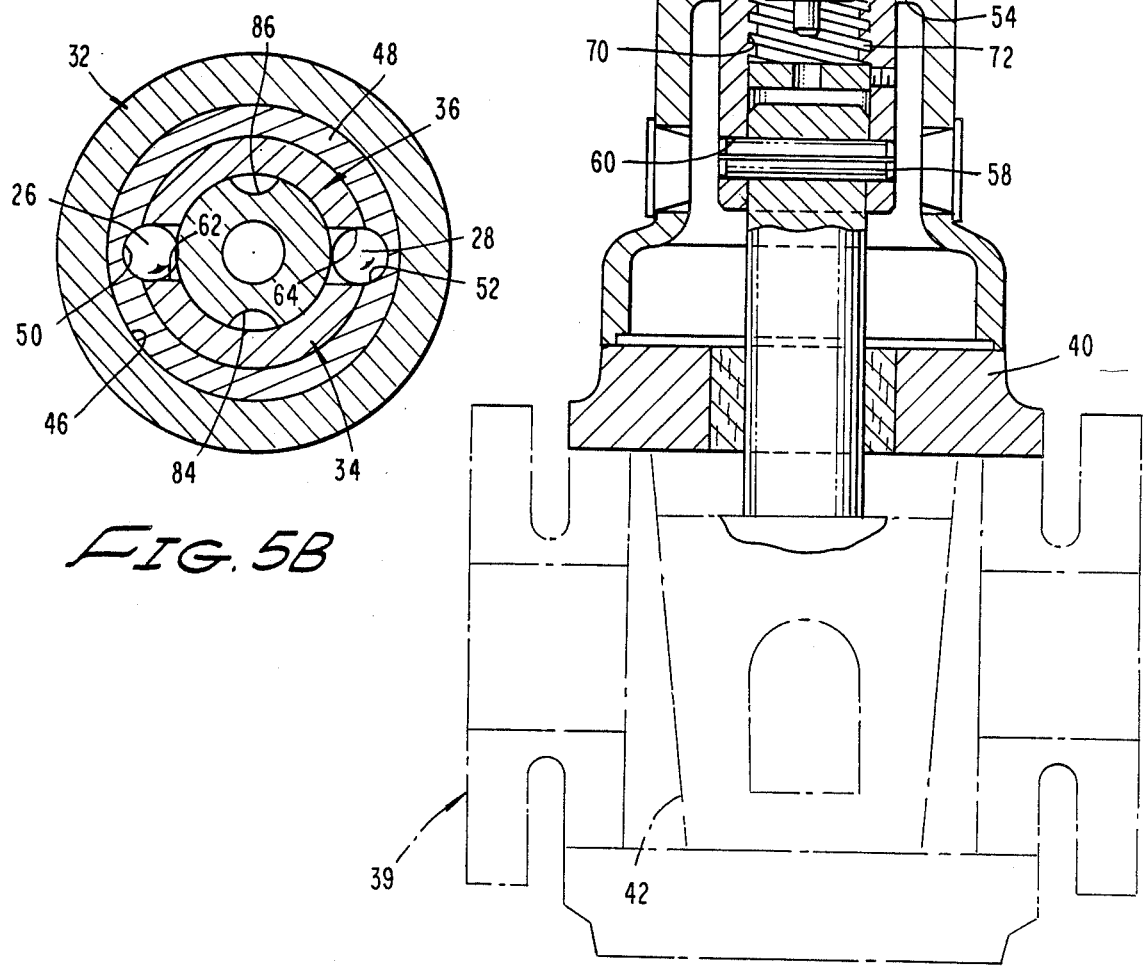
FIG. 5B is a cross-sectional view taken along line 5B—5B of FIG. 5A.
Figures 6A, 6B, 6C:
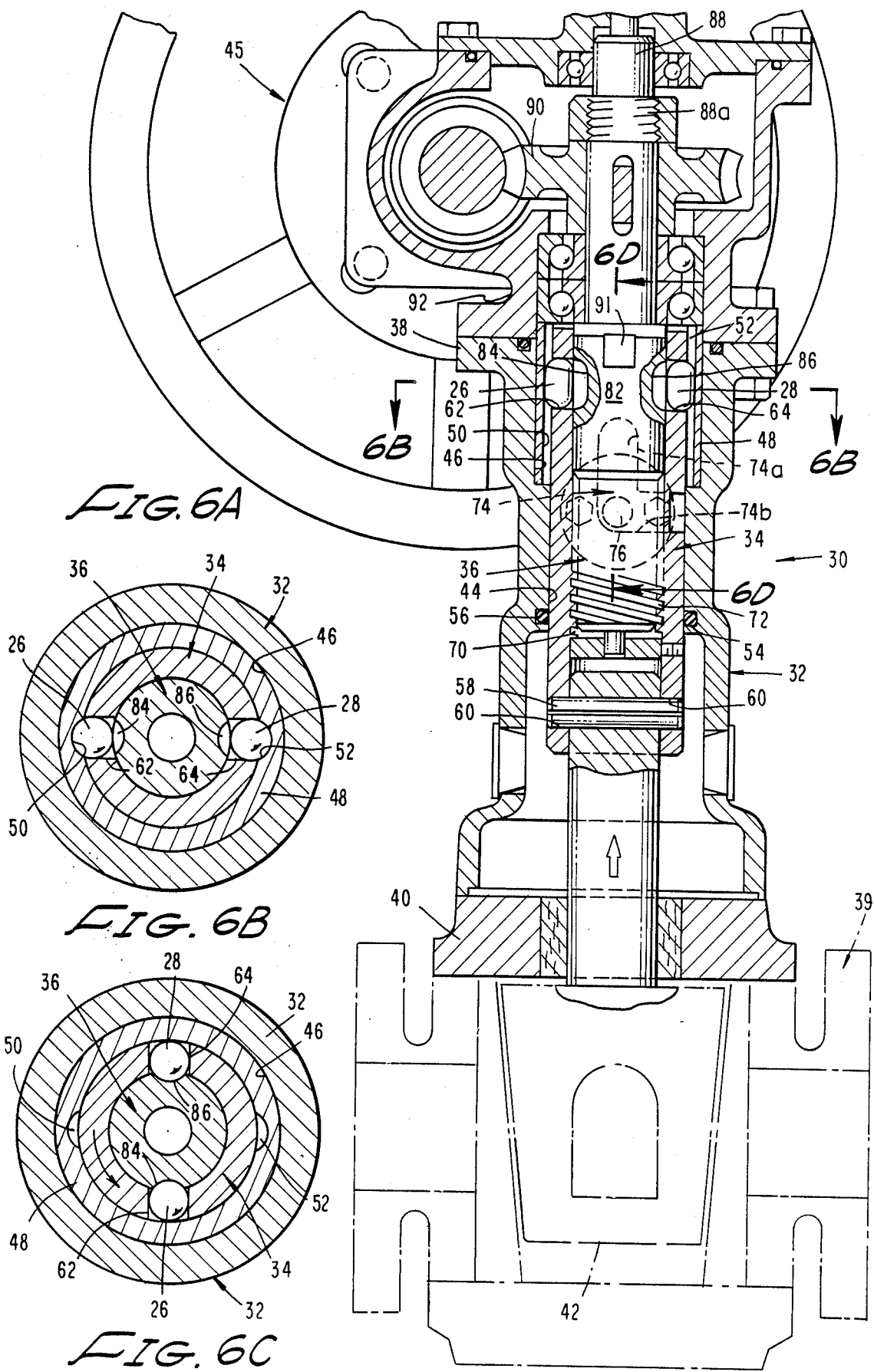
FIG. 6A is a longitudal cross-sectional view showing the valve operator of this invention in position where the plug is lifted from the seat of the valve body.
FIG. 6B is a cross-sectional view taken along line 6B—6B of FIG. 6A.
FIG. 6C is a cross-sectional view similar to that shown in FIG. 6B except with the spindle rotated 90 degrees.

The problem associated with the valve operator disclosed in U.S. Pat. No. 2,795,960 is illustrated in FIGS. 1, 2 and 3. The housing 10 of the valve operator includes a cavity 12 which receives the rotatable element or sleeve (not shown) which is threadably connected to a spindle 14 (FIG. 2) having a single recess 20 therein. The conventional valve operator employs a single roller element 15 (shown in dotted lines in FIG. 3) which moves laterally within a groove 16 provided in the internal wall 18 of the housing 10 forming the cavity 12. When this roller element 15 is opposite the recess 20, it will sometimes slip upon the spindle being rotated. This slippage results over time in scoring 22 of the wall of the spindle adjacent the recess and scoring 24 of the wall adjacent the groove in the housing. Eventually this scoring 22 and 24 becomes so excessive that the roller element 15 slips and does not perform the function that was intended, rendering the valve operator inoperable. The present invention eliminates this by employing two roller elements 26 and 28 diametrically opposed to each other as depicted in FIGS. 5A and 6A.

As illustrated in FIGS. 4 through 6D, the valve operator 30 of this invention includes a housing 32, a rotatable sleeve 34 seated in the housing, and a spindle 36 connected to the sleeve. As mentioned above, the characterizing feature of this invention is the use of the pair of roller elements 26 and 28 which act in a clutch-like fashion to allow the sleeve 34 to be moved linearly up and down and, when the sleeve is in the position shown in FIG. 6A, to be rotated through a 90 degree turn to open a valve 39. This will be discussed in greater detail subsequently.

The housing 32 is a generally hollow cylindrical member with a pair of flanges 38 and 40 at opposite ends which allow the housing to be connected to the body of the valve 39 which includes the plug 42 (shown in phantom lines), and at its upper end to a wheel and gear mechanism 45 which rotates the spindle 36 in either a clockwise or counter clockwise direction. A cavity 44 in the form of a generally cylindrical structure is formed by the internal wall of the housing 32 and it has an enlarged bore 46 near its upper end which is offset inwardly relative to the cavity 44. This bore 46 has seated within it a hollow cylindrical bushing 48, which is an optional feature. Within this bushing 48 are a pair of grooves 50 and 52 generally having a C-shaped cross-section. These grooves 50 and 52 are diametrically opposed to each other, and the bushing 48 could be eliminated and the grooves would then be in the housing wall. (The bushing 48 is considered part of the housing wall).

As best shown in FIG. 4, the sleeve 34 is also a generally hollow cylindrical member and it extends into the cavity 44 of the housing 32. Its diameter is just about equal to the diameter of the central section of the cavity 44. Thus, the external wall of the sleeve 34 fits flush against the internal housing wall at its central section. An annular groove 54 (FIGS. 5A and 6A) extends around the lower end of the housing wall adjacent the central section of the cavity 44. This annular groove 54 receives an O-ring seal 56.

The lower end of the sleeve 34 is connected to the plug 42 through a pin 58 which extends through the top of the plug and into and through a pair of aligned holes 60 in the lower end of the sleeve 34. Thus, when the sleeve 34 moves laterally, the plug 42 is lifted or lowered and, when the sleeve is rotated, the plug rotates. The upper end of the sleeve 34 has a pair of diametrically opposed elongated openings 62 and 64 which receive the roller elements 26 and 28. As best shown in FIGS. 5C and 6D, this upper end also includes a slightly enlarged internal bore 66 which forms an internal ledge 68 within the hollow central section of the sleeve 34. The internal wall of the sleeve 34 at its central section has an internal thread 70 which threadably receives the lower, threaded end 72 of the spindle 36 to connect the spindle to the sleeve.

The external wall of the sleeve 34 has an L shaped groove 74 in it, including a longitudinal leg 74a and a lateral leg 74b. The longitudinal leg 74a of this groove is located about midway between the two openings 62 and 64. This L-shaped groove 74 receives a guide pin 76 (shown in dotted lines in FIGS. 5A and 6A) which extends outwardly from the internal wall of the housing 32. When the sleeve 34 moves laterally upwardly or downwardly, the guide pin 76 moves in the longitudinal leg 74a of the groove and, when the sleeve is rotated, the guide pin moves in the lateral leg 74b of the groove.

At the upper end of the sleeve 34 there are two cut away sections 78 and 80. Each cut away section 78 and 80 includes an angular or inwardly biased edge 78a and 80a, respectively, which extends from a point immediately above the openings 62 and 64, respectively, to a point in the side wall of the sleeve about midway between the two openings. The cut away sections 78 and 80 pass then along a line parallel to the longitudinal axis of the sleeve to form flat stop walls 78b and 80b, respectively. Thus, there are two flat stop walls 78b and 80b about midway between each of the two openings 62 and 64.

The spindle 36 has three sections: the threaded lower end 72 which is threadably received within the threaded section of the sleeve 34, an enlarged central cylindrical section 82 which includes two recesses 84 and 86 which are diametrically opposed to each other, and an upper stem section 88 having a threaded end 88a which is connected to one gear 90 of the wheel and gear mechanism 45. A pair of diametrically opposed stop members 91 and 93 project outwardly from the side of the stem section 88. This spindle 36 is carried within a bearing member 92 which rests on top of the bushing 48 and is secured within the wheel and gear mechanism 45 to allow the spindle 36 to freely rotate either clockwise or counter clockwise. The recesses 84 and 86 are about the same size as the roller members and they receive the roller members when the valve operator 30 has been moved to the position shown in FIG. 6A.

OPERATION

Initially the roller members 26 and 28 are seated in the grooves 50 and 52 and in the openings 62 and 64 of the sleeve 34, with the sleeve being at its most inwardly position as shown in FIG. 5A. The plug 42 is seated within the body of the valve 39, closing the valve. Upon operation of the wheel and gear mechanism 45, the gears interact to turn the spindle 36. Turning the spindle 36 in a counter clockwise direction screws the threaded end 72 of the spindle into the threads 70 of the sleeve 34. This moves the sleeve 34 outwardly from the housing 32, lifting the plug 42 off the seat of the valve 39. Although the spindle 36 turns, the roller elements 26 and 28 seated within the grooves 50 and 52 & pin 76 prevent the sleeve 34 from rotating. This causes the sleeve 34 to move outwardly, with the roller elements 26 and 28 sliding along the grooves 50 and 52. The sleeve 34 will continue to move in a linear fashion until the roller elements 26 and 28 are opposite the recesses 84 and 86 in the spindle 36. As depicted in FIG. 6A, the sleeve 34 is in its furthest outward position when the roller elements 26 and 28 are exactly aligned with the recesses 84 and 86. The plug 42 has now been completely lifted off the valve seat. Further rotation of the spindle 36 in the counter clockwise direction results in the roller elements 26 and 28 slipping from the grooves 50 and 52 into the recesses 84 and 86. The guide pin 76 moves in the longitudinal leg 74a of the L-shaped groove 74 as the sleeve 34 moves along its linear path and will move along the lateral leg 74b of the L-shaped groove as the sleeve rotates.

Rotation of the sleeve 34 is provided upon the pair of stop members 91 and 93 carried by the stem section 88 engaging the flat stop walls 78b and 80b provided in the top of the sleeve 34. Thus, continued rotation of the wheel and gear mechanism 45 results in the counter clockwise rotation of the sleeve 34 through a 90 degree turn. When the sleeve 34 has been rotated through a 90 degree turn, the guide pin 76 is now at the end of the lateral leg 74b of the L-shaped groove 74, preventing further rotation of the sleeve. At this point the wheel and gear mechanism 45 can not be rotated further and the user knows that the plug 42 has been rotated through 90 degrees to align the opening in the plug with the ports of the valve 39, permitting fluid to flow through the valve.

Rotation of the wheel in a clockwise direction will result in the spindle rotating in a clockwise direction. The initial turn of the wheel and gear mechanism 45 in the clockwise direction, moves the lateral leg 74b of the L-shaped groove 74 until the stationary guide pin is at the bite between the two legs 74a and 74b of the groove. Further rotation in a clockwise direction results in the spindle 36 being screwed into the body of the sleeve 34, forcing the roller elements 26 and 28 from the recesses 84 and 86 and into the grooves 50 and 52. The roller elements 26 and 28 will move along these grooves 50 and 52 as the sleeve 34 moves linearly and inwardly, closing the valve 39 by seating the plug 42 on the seat in the valve body.

In accordance with this invention, the use of two roller elements 26 and 28 mounted within the valve operator 30 so that they are diametrically opposed to one another, results in an equal distribution of the forces acting on the sleeve 34 and keeps the spindle 36 and rotatable sleeve 34 centered. Thus, the roller elements 26 and 28 counter balance each other and do not result in scoring of the operator housing wall or deformation of the recesses 84 and 86 and scoring of the spindle wall. Over several years of use and experiencing high loads, the valve operator 30 of this invention did not become inoperable, as verified by field testing. Observation of the units after this in-field testing confirmed that the use of diametrically opposed roller elements 26 and 28 eliminated the problem encountered with the valve operator disclosed in U.S. Pat. No. 2,795,960.

SCOPE OF THE INVENTION

The above description presents the best mode contemplated of carrying out the present invention as depicted by the preferred embodiment disclosed. The combination of features illustrated by this embodiment overcomes the problem associated with the valve operator disclosed in U.S. Pat. No. 2,795,960. This invention is, however, susceptible to modifications and alternate constructions from the embodiment shown in the drawing and described above. Consequently, it is not the intention to limit it to the particular embodiment disclosed. On the contrary, the intention is to cover all modifications and alternate constructions falling within the scope of the invention as generally expressed by the following claims.

I claim:

1. A valve operator for a plug-type valve wherein a plug member is seated on a valve seat to close the valve and is lifted off the seat and rotated to open the valve, said valve operator including
   a housing having a wall defining a cylindrical cavity within the housing,
   a pair of elongated, longitudinal grooves in said wall which are diametrically opposite each other,
   a spindle having therein a pair of recesses which are diametrically opposite each other and an end portion extending from the housing,
   a pair of roller elements, each one lodged in one of said grooves, with a portion extending from said groove and movable along said groove from a first position longitudinally displaced from one of said recesses to a second position aligned with said one recess,
   a rotatable cylindrical element received in the cavity and fitting snugly against said wall, said rotatable element having therein a pair of openings diametrically opposite each other, each one of said openings receiving therein one of said roller elements,
   thread means connecting the spindle to the rotatable element to enable the spindle to be screwed into and out of the rotatable element,
   means connected to the end portion of the spindle which enable the spindle to be manually turned, and
   whereby turning the spindle in one direction screws the spindle into the rotatable element to pull the rotatable element outwardly from the cavity with the roller elements preventing rotation of the rotatable element while in the first position and sliding along said groove as the rotatable element moves outwardly until in the second position, whereupon said roller elements, upon further turning of the spindle, move from the grooves into the recesses to allow rotation of the rotatable element.

2. The valve operator of claim 1 wherein the rotatable element has
   an end section adjacent the pair of openings formed by a wall having a cut away section which is between said pair of openings and provides stop means, and
   the spindle has stop means which engage the stop member on the rotatable element when said roller elements are in the second position.

3. A plug-type valve including
   a plug adapted to rest on a seat in the valve, and
   a valve operator for lifting the plug off the seat, said valve operator including
   a spindle having a pair of diametrically opposed recesses therein, and
   a clutch-type mechanism comprising a sleeve threadably connected to the spindle and a pair of diametrically opposed roller elements which are mounted to move linearly a predetermined distance between a position where the roller elements are aligned with the recesses and a displaced position where the roller elements are not in alignment with the recesses.

4. The plug-type valve of claim 3 wherein the end portion of the sleeve includes stop means which are interactive with stop means on the spindle.

5. A plug-type valve including a plug adapted to rest on a seat in the valve, and a valve operator for lifting the plug off the seat and rotating it through a 90 degree turn, said valve operator including a housing having an internal wall with a pair of grooves therein diametrically opposite each other, a spindle having therein a pair of recesses which are diametrically opposite each other, a pair of roller elements, one in each of the grooves, a movable element in the housing and having openings which receive the roller elements and allow the roller elements to pass through the openings into the recesses upon alignment of the roller elements with the recesses, and means for moving the movable element between a displaced position where the roller elements are displaced from the recesses to a position where the roller elements are aligned with the recesses.

* * * * *